United States Patent
Presler-Marshall et al.

(10) Patent No.: US 8,214,815 B2
(45) Date of Patent: *Jul. 3, 2012

(54) REDUCING THE RUN-TIME COST OF INVOKING A SERVER PAGE

(75) Inventors: Martin J. Presler-Marshall, Chapel Hill, NC (US); Scott H. Snyder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 925 days.

This patent is subject to a terminal disclaimer.

(21) Appl. No.: 12/255,032

(22) Filed: Oct. 21, 2008

(65) Prior Publication Data

US 2009/0055811 A1 Feb. 26, 2009

Related U.S. Application Data

(62) Division of application No. 10/794,967, filed on Mar. 5, 2004, now Pat. No. 7,458,070.

(51) Int. Cl.
*G06F 9/44* (2006.01)
*G06F 9/45* (2006.01)

(52) U.S. Cl. ........................................................ 717/151
(58) Field of Classification Search ........................ None
See application file for complete search history.

(56) References Cited

U.S. PATENT DOCUMENTS

| 6,463,578 B1 * | 10/2002 | Johnson | 717/124 |
| 6,507,946 B2 * | 1/2003 | Alexander et al. | 717/145 |
| 2001/0047402 A1 * | 11/2001 | Saimi et al. | 709/219 |
| 2002/0007482 A1 * | 1/2002 | Cirne | 717/2 |
| 2002/0080200 A1 * | 6/2002 | Wong et al. | 345/969 |
| 2003/0229849 A1 * | 12/2003 | Wendt | 715/513 |

* cited by examiner

*Primary Examiner* — Qing Wu
(74) *Attorney, Agent, or Firm* — Steven M. Greenberg, Esq.; Carey, Rodriguez, Greenberg & O'Keefe

(57) ABSTRACT

The present invention is a method, system and apparatus for reducing the run-time cost of invoking a server page. The system can include a server page translation unit configured to translate a server page document into program code. The system also can include a program code compiler configured to compile the program code into a program object. Finally, the system can include an optimization processor programmed to modify the program code to permit direct invocation of the program object by external program objects bypassing a server engine typically used to invoke the server page. Notably, in a preferred aspect of the invention the server page can be a JSP. Similarly, the program code can be Java source code and the program object can be a Java class. Finally, the external program objects can be servlets.

2 Claims, 3 Drawing Sheets

REDUCING THE RUN-TIME COST OF INVOKING A SERVER PAGE

CROSS-REFERENCE TO RELATED APPLICATIONS

This application is a Divisional of U.S. application Ser. No. 10/794,967, filed on Mar. 5, 2004, which is incorporated herein by reference in its entirety.

BACKGROUND OF THE INVENTION

1. Statement of the Technical Field

The present invention relates to the deployment of a server page in a multi-tier distributed application environment and more particularly to the modification of a server page to reduce the cost of incorporating custom tags in the server page.

2. Description of the Related Art

Traditional client server application mix presentation and business logic in the client tier while the server tier provides backend data storage and server side business logic. Consequently, client server applications typically cannot scale within the enterprise given the difficulty in maintaining both the client tier and the server tier. Specifically, changes to the presentation layer of an application require the modification of the client side application which can impact the integrity of the business logic within the client tier. Similarly, changes to the business logic of the client can jeopardize the integrity of the presentation code in the client tier. Developing for the client tier also can be problematic where logic developers further develop the presentation layer, or where human factors designers develop for the logic layer of the application in the client tier.

To force a separation of the presentation and logic layers as is preferred among contemporary computer scientists, server page technologies have become the preferred vehicle for multi-tier application. Server page technologies release the client tier from the responsibility of processing logic for rendering the presentation layer. Moreover, server pages largely separate presentation layer logic from the static elements of the presentation layer so that user interface designers can perform changes to the static elements of the presentation layer without breaching the integrity of the programmatic elements of the presentation layer.

Typical server page technologies permit a mixing of statically defined user interface elements and programmatic scripts in a single document. The programmatic scripts can be processed server-side to produce a translated presentation layer document. The translated presentation layer document can be delivered to the client side where the translated presentation layer document can be rendered to a user interface. Notably, in addition to embedded programmatic scripts, the server page further can include macro references to externally defined programmatic logic. In this way, the complexity of the programmatic logic can be hidden from the view of the user interface designer charged with the development and maintenance of the server page.

JavaServer Page™ (JSP) and the active server page (ASP) represent two popular server page technologies which have been deployed widely in recent years. JSPs, in particular, are a well-known and accepted method of displaying content in a Web application. JSPs combine the ease of use of a markup language document for the Web developer with power and flexibility of a scripting language for the applications developer. Consequently, at present JSPs are the preferred way to display information produced by the business logic of an application deployed within an application server, such as the WebSphere® application server manufactured by the International Business Machines Corporation of Armonk, New York, United States of America.

Notably, the ease of use of the JSP stems from the fact that a JSP typically consists mostly of markup, which can be created and managed by a Web developer using familiar development tools. The power of the JSP, on the other hand, stems from the fact that a JSP can contain arbitrary Java code. Advantageously, the jointly formed document can be compiled and the resulting compilation can be executed by a JSP aware Web application server such as the WebSphere™ application server manufactured by IBM Corporation of Armonk, New York.

Despite the ease of use and power associated with server page technologies, invoking a server page comes at a cost. Specifically, server pages can be expensive to process from a computing resources perspective. At each invocation, lifecycle processes can be performed and the logic access mechanism itself can involve complex request parsing and processing. While in the circumstance of an ordinary Web application, the overhead consumed in the processing of the server page can be overshadowed by the processing latencies of the Web application, in the case of a Web portal where server pages aggregate, decorate and display content, ten or more server pages can be executed and the effect of the processing overhead can prove substantial.

SUMMARY OF THE INVENTION

The present invention addresses the deficiencies of the art in respect to the invocation of a server page and provides a novel and non-obvious method, system and apparatus for modifying a server page to reduce the cost of invoking the server page at run-time. Specifically, the method can include the step of modifying program code translated from a server page to permit direct invocation of at least one method defined in the program code by external program objects without utilizing a server page invoker. The modifying step further can include the step of modifying the program code prior to compiling the program code into a directly callable program object. Alternatively, the modifying step further can include the step of modifying the program code by modifying byte code produced by compiling the program code.

In a preferred aspect of the invention, the modifying step can particularly include stripping a super-class designation for a constructor in the program code. Additionally, the modifying step can include the step of inserting required import statements into the program code. Finally, the modifying step can include the step of modifying at least one method call signature to permit a specification of input and output parameters processed in a corresponding at least one method.

A system for reducing the run-time cost of invoking a server page can include a server page translation unit configured to translate a server page document into program code. The system also can include a program code compiler configured to compile the program code into a program object. Finally, the system can include an optimization processor programmed to modify the program code to permit direct invocation of the program object by external program objects. Notably, in a preferred aspect of the invention the server page can be a JSP. Similarly, the program code can be Java source code and the program object can be a Java class. Finally, the external program objects can be servlets.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for reducing the run-time cost of invoking a server page. In accordance with the present invention, a server page produced to dynamically generate a viewable page can be translated into program code configured for compilation into an executable (or interpretable object). The program code can be parsed to identify the operable portion of the server page and further to identify variables used by logic defined in the operable portion of the server page, and imported information required for the operation of the server page. Subsequently, the program code can be modified to permit direct invocation of logic disposed in the operable portion of the server page without requiring the use of a server page engine.

In this regard, the call signature for an operable portion of the server page can be modified to accept parameterized variable information typically provided to the server page through a request/response mechanism ordinarily associated with a server page. Also, to the extent required, the super-class for the operable portion of the server page can be removed to permit the direct calling of the logic disposed in the operable portion, and the required imported information can be specified in the modified program code as well. Finally, where required, the package name for the operable portion of the server page can be modified both to ensure callability by external logic and to avoid unnecessary conflicts with other callable logic in the application. Once the program code has been modified, the program code can be compiled and persisted for subsequent calling by external application logic.

Figure 1:
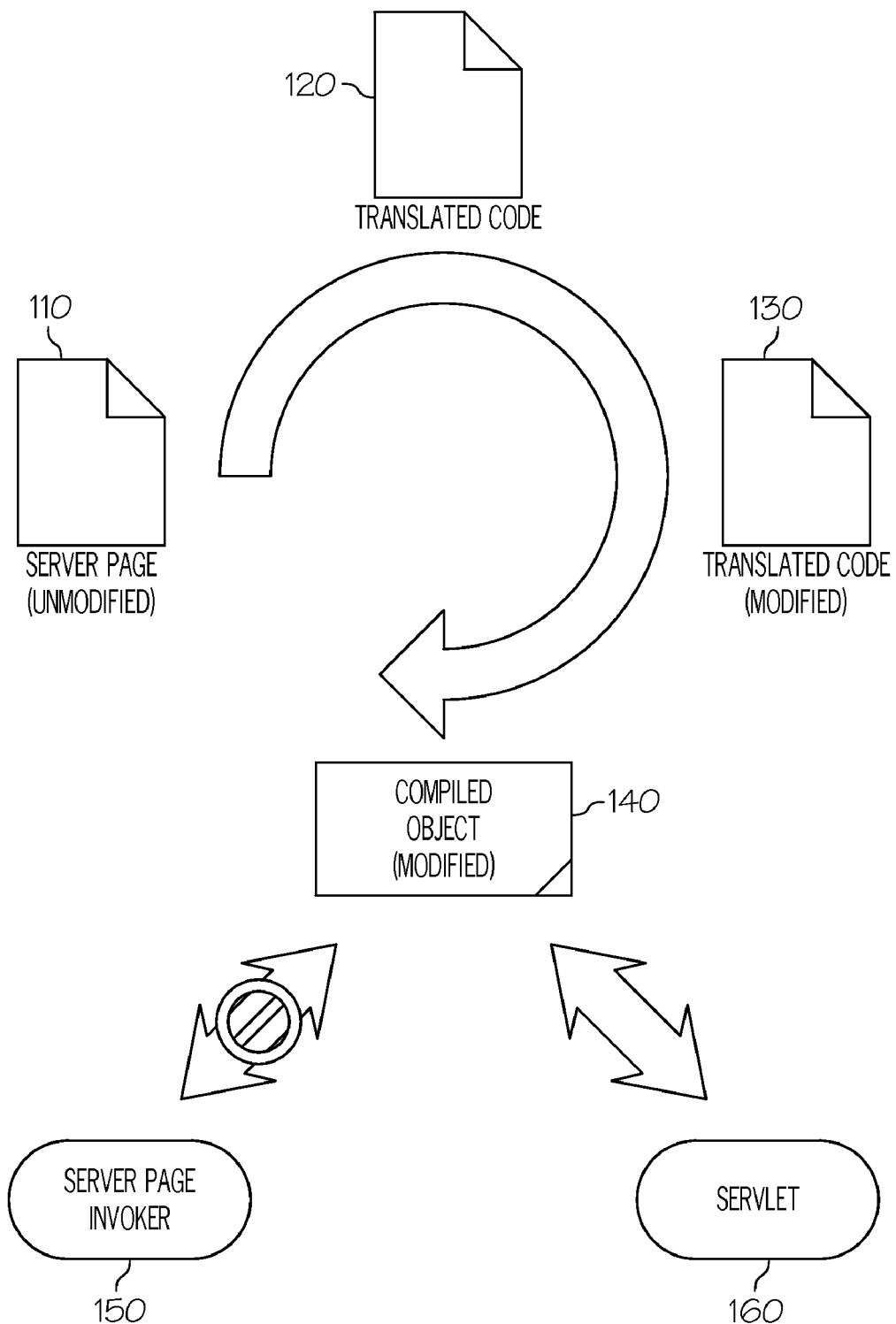
FIG. 1 is a pictorial illustration of a system and method for reducing the run-time cost of invoking a server page.

In more particular explanation, FIG. 1 is a pictorial illustration of a system for reducing the run-time cost of invoking a server page. In the present invention, an unmodified server page 110 can be translated to program code 120 able to be compiled into a program object for use by a server page engine as is well-known in the art. The process of compiling a server page can include both a translation step during which step the server page can be translated into program code, and also a compilation step during which step the program code can be compiled into an executable object such as a callable class. Notably, in the present invention, before the translated program code 120 can be compiled into an executable object, the translated program code 120 first can be transformed into modified translated code 130.

The modified translated code 130 can include modifications sufficient to permit the direct callability of program logic disposed within the translated program code 120. For example, the modified translated code 130 can include modified method call signatures configured to accept variable input in the form of parameters which otherwise would be provided through the server page mechanism. Consequently, once the modified translated code 130 has been compiled into a compiled object 140, the logic of the compiled object 140 can be called directly by external program logic such as a servlet 150 without requiring the use of a server page invoker 150 as an intermediary.

Figure 2:
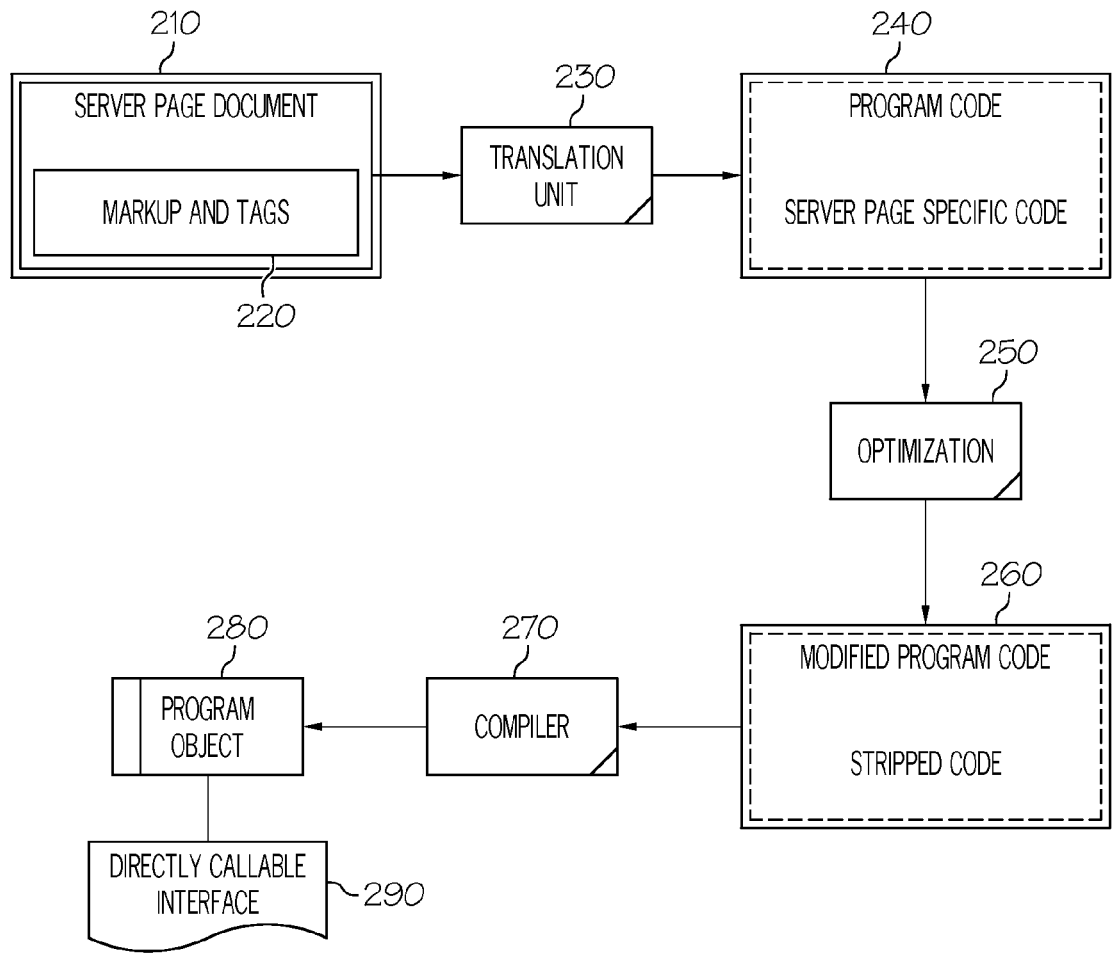
FIG. 2 is a block diagram illustrating a system and method for reducing the cost of invoking a server page at run-time; and, FIG. 3 is a flow chart illustrating a process for reducing the run-time cost of invoking a server page in the system of FIG. 2.

In further illustration, FIG. 2 is a block diagram depicting a system and method for reducing the cost of invoking a server page at run-time. As shown in the block diagram of FIG. 2, a server page document 210 can include markup and tags 220. The markup and tags 220 can specify both static visual elements and logic instructions. The markup and tags 220 further can reference externally defined logical operations by way of custom tags as is known in the art. To that end, the server page document 210 can be a JSP or ASP conforming document configured for use in a Web distributed application.

A translation unit 230 can process the server page document 210 to produce program code 240. In this regard, the translation unit 230 can process the markup and tags 220 of the server page document 210 to produce server page specific code able to be compiled into a program object. In a preferred aspect of the invention, the server page specific code can include a class comprised both of a constructor and optional companion methods for performing logical operations specified within the server page document 210. The program method can derive from a server page related super-class in as much as the server page engine can maintain responsibility for processing the server page specific code under normal circumstances.

Importantly, an optimization process 250 can modify the program code 240 to produce the modified program code 260. The modified program code 260 can include a "stripped" rendition of the server page specific code. More particularly, the super-class specified for the class of the program code 240 can be changed to reflect a directly callable class. Moreover, the imports required by a directly callable form of the class can be specified within the modified program code 260. Finally, the call signature for each of the constructor and methods for the class can be changed in the modified program code 260 to permit direct callability by external program logic.

A compiler 270 can compile the modified program code 260 to produce a program object. The compiled program object 280, however, need not conform to the prototypical object callable only through the action of a server page invoker. Rather, the modified program code 260 when compiled into the program object 280 can include a directly callable interface 290 which can facilitate the direct invocation of the constructor and methods of the modified program code 260 by external logic, including servlets. In this way, the computing resources ordinarily consumed in processing a server page can be conserved through the direct calling of the constructor and methods without also requiring the use of the server page invoker.

Figure 3:
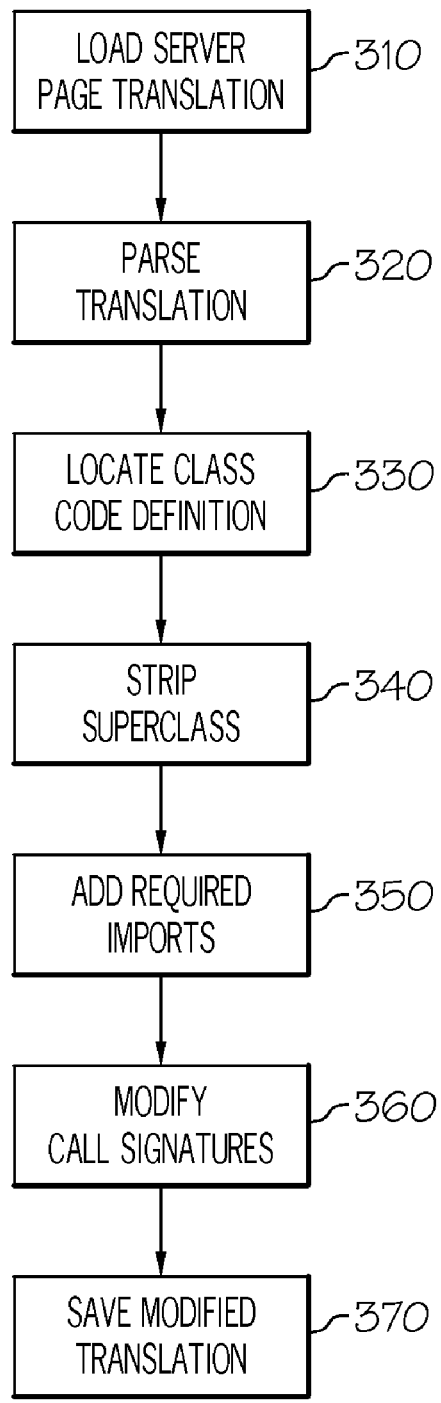

FIG. 3 is a flow chart illustrating a process for reducing the run-time cost of invoking a server page in the system of FIG.

2. Beginning in block 310, a server page translation can be loaded. In block 320, the server page translation can be parsed to identify the constituent portions of the server page translation. In block 330, the class definition can be located in the loaded server page translation and in block 340, the super-class designation for the constructor of the class can be stripped from the translation. In block 350, import statements required for the direct operation of the class can be added to the translation. In block 360, the call signatures for the constructor and any associated methods can be modified to permit the passing of parameters required for the operation of the constructor and methods. Finally, in block 370 the modified translation can be stored.

Importantly, it is to be understood by the skilled artisan that the foregoing methodology does not relate to the exclusive means for performing the inventive method for reducing the run-time cost of invoking a server page. Rather, other alternative embodiments are contemplated as within the scope of the present invention. As an example, in an alternative embodiment of the present invention, the modification of the program code can occur through byte code replacement subsequent to compilation.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim

1. A system for reducing the run-time cost of invoking a server page comprising:

a server page translation unit configured to translate a server page document into program code;

a program code compiler configured to compile said program code into a program object; and, an optimization processor programmed to modify said program code to permit direct invocation of said program object by external program objects, wherein said optimization processor modifies said program code by:

stripping a super-class designation for a constructor in said program code;

inserting required import statements into said program code; and, modifying at least one method call signature to permit a specification of input and output parameters processed in a corresponding at least one method.

2. The system of claim 1, wherein said external program objects are servlets.

* * * * *